(12) United States Patent
Yang

(10) Patent No.: US 12,047,952 B2
(45) Date of Patent: Jul. 23, 2024

(54) RESOURCE ALLOCATION METHOD AND DEVICE

(71) Applicant: VIVO MOBILE COMMUNICATION CO., LTD., Guangdong (CN)

(72) Inventor: Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 470 days.

(21) Appl. No.: 17/212,069

(22) Filed: Mar. 25, 2021

(65) Prior Publication Data

US 2021/0212049 A1   Jul. 8, 2021

Related U.S. Application Data

(63) Continuation of application No. PCT/CN2019/106934, filed on Sep. 20, 2019.

(30) Foreign Application Priority Data

Sep. 26, 2018  (CN) .......................... 201811126005.3

(51) Int. Cl.
| | |
|---|---|
| *H04W 72/20* | (2023.01) |
| *H04L 1/1812* | (2023.01) |
| *H04W 72/0446* | (2023.01) |
| *H04W 72/0453* | (2023.01) |

(52) U.S. Cl.
CPC .......... *H04W 72/20* (2023.01); *H04L 1/1812* (2013.01); *H04W 72/0446* (2013.01); *H04W 72/0453* (2013.01)

(58) Field of Classification Search
CPC ............. H04W 72/20; H04W 72/0446; H04W 72/0453; H04W 76/023; H04W 76/14; H04W 24/10; H04W 4/06; H04W 72/02; H04W 72/042; H04W 72/085; H04W 72/23; H04W 72/542; H04L 1/1812
See application file for complete search history.

(56) References Cited

U.S. PATENT DOCUMENTS

| | | | |
|---|---|---|---|
| 2013/0308549 A1 | 11/2013 | Madan et al. | |
| 2015/0373586 A1 | 12/2015 | Uchino et al. | |
| 2017/0006653 A1* | 1/2017 | Zeng | H04W 72/23 |
| 2020/0092692 A1* | 3/2020 | Wang | H04W 76/14 |
| 2020/0137729 A1* | 4/2020 | Tang | H04W 72/20 |

(Continued)

FOREIGN PATENT DOCUMENTS

| | | |
|---|---|---|
| CN | 101237308 A | 8/2008 |
| CN | 101867971 A | 10/2010 |

(Continued)

OTHER PUBLICATIONS

WO 2018/171540 A1 (Year: 2018).*

(Continued)

*Primary Examiner* — Rushil P. Sampat
(74) *Attorney, Agent, or Firm* — Harness, Dickey & Pierce, P.L.C.

(57) ABSTRACT

Embodiments of the present disclosure disclose a resource allocation method and a device. The method includes: receiving resource configuration information from a transmit-end device, where the resource configuration information is used by the receive-end device to determine a configured resource that needs to be canceled.

16 Claims, 3 Drawing Sheets

(56) References Cited

U.S. PATENT DOCUMENTS

2020/0280977 A1    9/2020   Chen et al.
2020/0344756 A1   10/2020   Lee et al.
2021/0185658 A1    6/2021   Feng

FOREIGN PATENT DOCUMENTS

| CN | 102083224 | A | 6/2011 |
| CN | 104322125 | A | 1/2015 |
| CN | 105101430 | A | 11/2015 |
| CN | 107613564 | A | 1/2018 |
| CN | 108024285 | A | 5/2018 |
| CN | 108141877 | A | 6/2018 |
| CN | 108353415 | A | 7/2018 |
| WO | WO-2013020403 | A1 | 2/2013 |

OTHER PUBLICATIONS

Supplementary European Search Report for Application No. PCT/CN2019/106934, dated Nov. 10, 2021.
"Discussion on handling UL multiplexing of transmissions with different reliability requirements," vivo, 3GPP TSG RAN WG1 Meeting #92bis, R1-1803848, dated Apr. 20, 2018.
International Search Report and Written Opinion of the International Searching Authority regarding International Patent Application No. PCT/CN2019/106934, dated Dec. 3, 2019. Translation provided by Bohui Intellectual Property.
Extended European Search Report regarding European Patent Application No. 24158846.6, dated Apr. 3, 2024.

* cited by examiner

Receiving resource configuration information from a transmit-end device, where the resource configuration information is used by the receive-end device to determine a configured resource that needs to be canceled ~ S110
FIG. 1
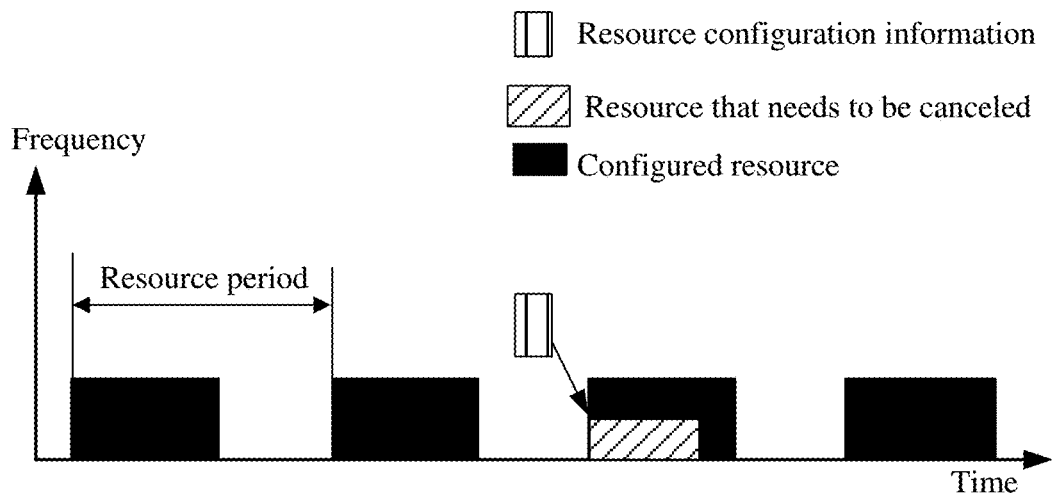
FIG. 2
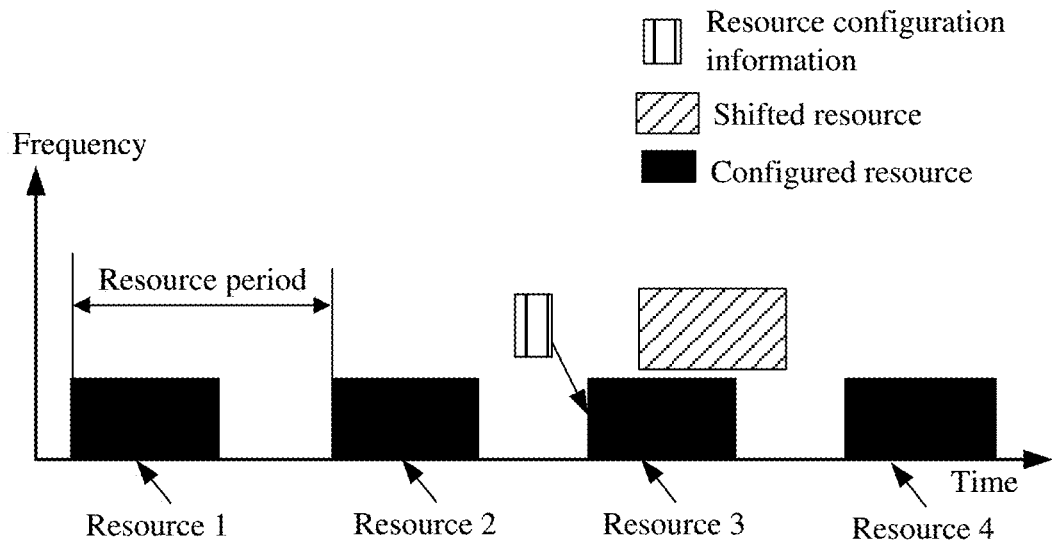
FIG. 3

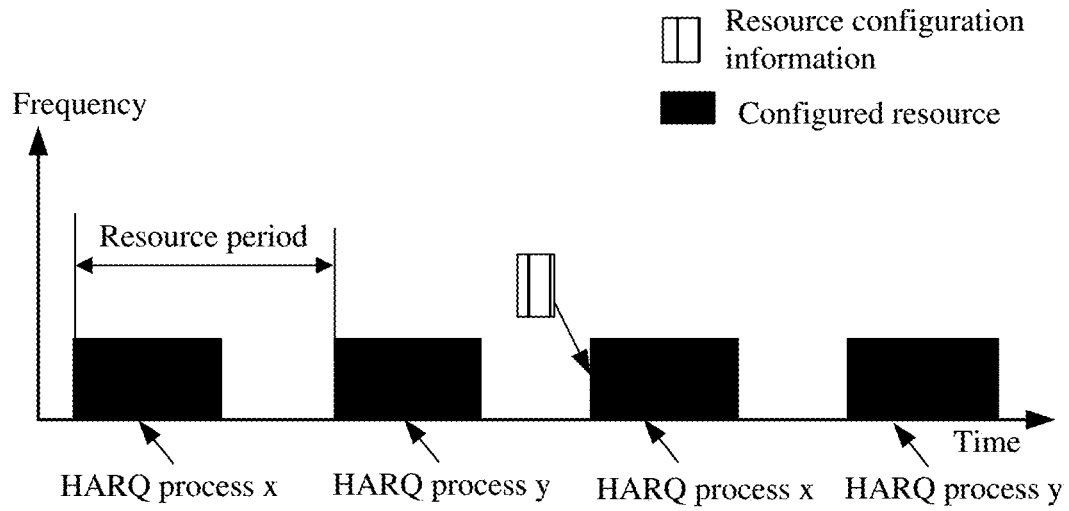
FIG. 4
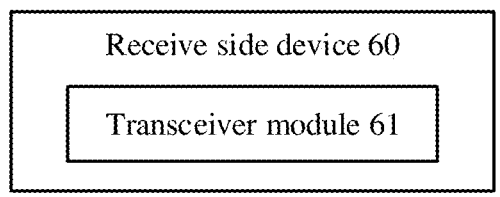
FIG. 5
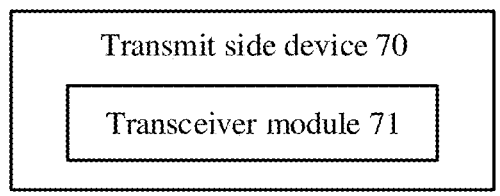
FIG. 6
FIG. 7

RESOURCE ALLOCATION METHOD AND DEVICE

CROSS-REFERENCE OF RELATED APPLICATIONS

This application is a Bypass Continuation Application of PCT/CN2019/106934, filed on Sep. 20, 2019, which claims priority to Chinese Patent Application No. 201811126005.3, filed on Sep. 26, 2018, which are incorporated herein by reference in their entirety.

TECHNICAL FIELD

The present disclosure relates to the field of communications technologies, and more specifically, to a resource allocation method and a device.

BACKGROUND

A long term evolution (Long Term Evolution, LTE) system starts to support sidelink (Sidelink) communication from release 12. Sidelink communication is used for direct data transmission between terminal devices (User Equipment, UE) without a network device. In sidelink communication, UE sends sidelink control information (Sidelink Control Information, SCI) through a physical sidelink control channel (Physical Sidelink Control Channel, PSCCH), and schedules transmission of a physical sidelink shared channel (Physical Sidelink Shared Channel, PSSCH) to send data.

SUMMARY

According to a first aspect, a resource allocation method is provided. The method is applied to a receive side device, and includes: receiving resource configuration information from a transmit side device, where the resource configuration information is used by the receive side device to determine a configured resource that needs to be canceled.

According to a second aspect, a resource allocation method is provided. The method is applied to a transmit side device, and includes: sending resource configuration information to a receive side device, where the resource configuration information is used by the receive side device to determine a configured resource that needs to be canceled.

According to a third aspect, a receive side device is provided, and includes: a network interface, configured to receive resource configuration information from a transmit side device, where the resource configuration information is used by the receive side device to determine a configured resource that needs to be canceled.

According to a fourth aspect, a transmit side device is provided, and includes: a transceiver module, configured to send resource configuration information to a receive side device, where the resource configuration information is used by the receive side device to determine a configured resource that needs to be canceled.

According to a fifth aspect, a receive side device is provided, and includes: a memory, a processor, and a computer program that is stored in the memory and that can run on the processor, and the computer program, when executed by the processor, causes the receive side device to implement: receiving resource configuration information from a transmit side device, where the resource configuration information is used by the receive side device to determine a configured resource that needs to be canceled. The computer program when executed by the processor implementing the steps of:

according to a sixth aspect, a transmit side device is provided, and includes: a memory, a processor, and a computer program that is stored in the memory and that can run on the processor, and when the computer program is executed by the processor, steps in the resource allocation method provided in the second aspect are implemented.

According to a seventh aspect, a non-transitory computer-readable medium stores is provided, where the non-transitory computer-readable storage medium stores a computer program, and when the computer program is executed by a processor, steps in the method provided in the first aspect are implemented.

According to an eighth aspect, a non-transitory computer-readable storage medium is provided, where the non-transitory computer-readable storage medium stores a computer program, and when the computer program is executed by a processor, steps of the method provided in the second aspect are implemented.

BRIEF DESCRIPTION OF DRAWINGS

The accompanying drawings illustrated herein are provided to further understand the present disclosure and form a part of the present disclosure. The exemplary embodiments of the present disclosure and the descriptions thereof are used to explain the present disclosure and do not constitute an improper limitation on the present disclosure. In the accompanying drawings:

FIG. 1 is a schematic flowchart 1 of a resource allocation method according to the present disclosure;

FIG. 2 is a schematic diagram 1 of a resource allocation method according to the present disclosure;

FIG. 3 is a schematic diagram 2 of a resource allocation method according to the present disclosure;

FIG. 4 is a schematic diagram 3 of a resource allocation method according to the present disclosure;

FIG. 5 is a schematic flowchart 2 of a resource allocation method according to the present disclosure;

FIG. 6 is a schematic structural diagram 1 of a receive side device according to the present disclosure;

FIG. 7 is a schematic structural diagram 1 of a transmit side device according to the present disclosure;

DETAILED DESCRIPTION OF EMBODIMENTS

Figure 8:
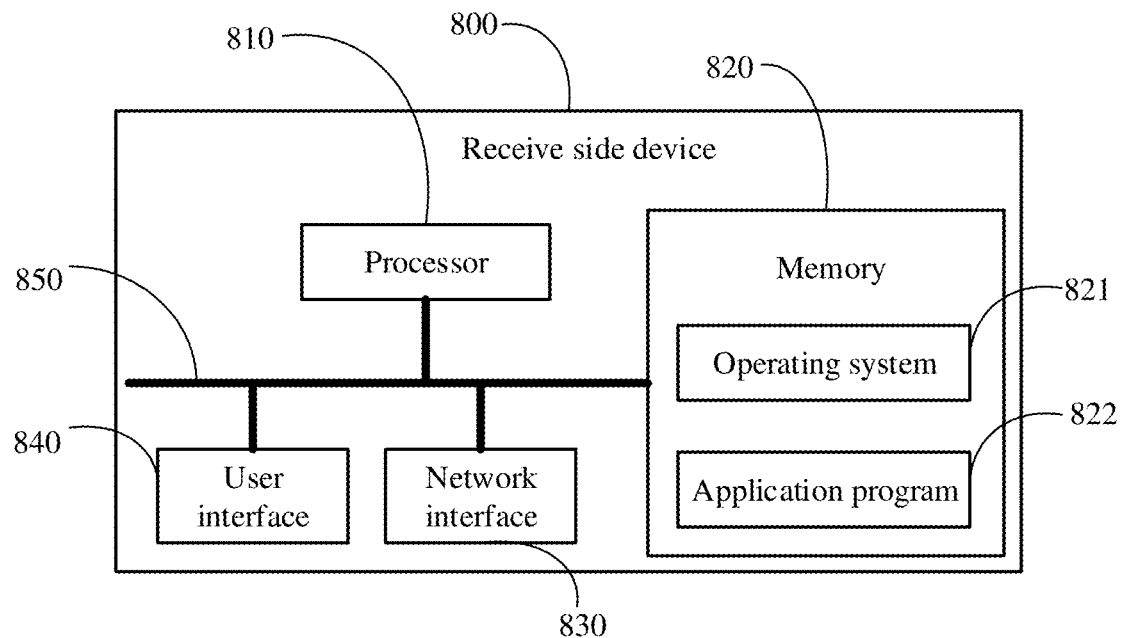
FIG. 8 is a schematic structural diagram 2 of a receive side device according to the present disclosure.

Following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The technical solutions of the present disclosure can be applied to various communications systems, such as a long term evolution (LTE)/long term evolution-advanced (LTE-A) system, a new radio (New Radio, NR) system, an LTE sidelink system, an NR sidelink system, etc.

In some embodiments of the present disclosure, a terminal device (User Equipment, UE), also known as a mobile terminal, mobile user equipment, etc., may communicate with one or more core networks through a radio access network (for example, Radio Access Network, RAN). The user equipment may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network.

In some embodiments of the present disclosure, the network device is an apparatus deployed in a radio access network to provide a wireless communication function for the terminal device. For example, the network device can be a base station, which can be an evolved NodeB (eNB or e-NodeB) and a 5G base station (gNB) in LTE.

In some embodiments of the present disclosure, the receive side device is receiving terminal device UE on a sidelink, and the transmit side device is sending UE on the sidelink; or the receive side device is sending UE on a sidelink, and the transmit side device is a network device or resource allocation UE on the sidelink.

An LTE sidelink is applicable for specific public safety affairs (such as emergency communications for disaster circumstances of fire emergency or earthquake) or vehicle to everything (Vehicle to Everything, V2X) communication, and so on. Vehicle to everything communication includes various services, such as basic security-related communications, advanced (autonomous) driving, platooning, and sensor extension. However, because an LTE sidelink only supports broadcast communication, it is mainly used for basic security-related communication, and other advanced V2X services are supported by a new radio (New Radio, NR) sidelink.

In NR sidelink communication, to meet the requirement of a low-delay service, a resource allocation period needs to be reduced. As a result, when there is a plurality of UE for a network device (for example, high-density scenario of vehicle to everything) and each UE needs to be configured with a resource, there is no available idle resource. In addition, the UE has been configured with a resource when no service arrives, which reduces resource utilization.

Following describes the technical solutions in various embodiments of the present disclosure in detail with reference to the accompanying drawings.

FIG. 1 shows a resource allocation method according to some embodiments of the present disclosure. The method shown in FIG. 1 is applied to the receive side device, and as shown in FIG. 1, the method includes:

S110: receiving resource configuration information from a transmit side device, where the resource configuration information is used by the receive side device to determine a configured resource that needs to be canceled.

The resource configured in S110 can be configured for the receive side device in a scheduled resource allocation mode, or can be configured for the receive side device in an autonomous resource selection mode. In the scheduled resource allocation mode, the network device performs control and allocates a resource for each UE. In the autonomous resource selection mode, a resource is autonomously selected by UE from a resource pool.

The resource pool is sent or preconfigured by the network device. The resource pool includes resource and transmission-related parameters used in discovery or transmission of a sidelink, for example, includes an offset of a first subframe of the resource pool, a bitmap corresponding to the resource pool, whether a physical sidelink control channel (PSCCH) and a physical sidelink shared channel (PSSCH) are transmitted in an adjacent resource block (RB), the number of subchannels and the size of each subchannel, a minimum RB index corresponding to a subchannel, a minimum RB index corresponding to a PSCCH pool, a received signal strength indicator (S-RSSI) threshold of channel busy rate (CBR) measurement, an area identifier, etc.

In some embodiments, the resource configuration information can be sent by the transmit side device by using a medium access control control element (MAC CE), or can be sent by the transmit side device by using physical layer signaling. The resource that needs to be canceled can be an SPS resource supporting semi-persistent scheduling (SPS) transmission or a grant-free resource supporting grant-free transmission. The resource that needs to be canceled can be an SPS resource or a grant-free resource, can be an SPS resource or a grant-free resource on one carrier (for example, the receive side device is configured with resources on multiple carriers, and the resource that needs to be canceled is a resource on one of the multiple carriers), can be an SPS resource or a grant-free resource on one bandwidth part (BWP) (for example, the receive side device is configured with multiple bandwidth parts, and the resource that needs to be canceled is a resource on one of the multiple bandwidth parts), or can be some time frequency resources of an SPS resource or a grant-free resource.

In some embodiments, the resource that needs to be canceled is a configured resource of the receive side device that is canceled. The resource configuration information includes at least one of following information: information used to indicate a configured time domain resource and/or frequency domain resource of the receive side device that is canceled; information used to indicate a start time or an end time of a configured resource of the receive side device that is canceled; information used to indicate a quantity of resource periods corresponding to a configured resource of the receive side device that is canceled; information used to indicate a quantity of configured resources of the receive side device that are canceled; information used to indicate a quantity of symbols or a quantity of slots occupied by a configured resource of the receive side device that is canceled; or information used to indicate a BWP or a carrier of a symbol occupied by a configured resource of the receive side device that is canceled.

For example, as shown in FIG. 2, the filled solid part in FIG. 2 represents a resource that has been configured for the receive side device, the filled vertical part represents the resource configuration information, and the filled slash part represents a resource that needs to be canceled. If the resource configuration information received by the receive side device includes information used to indicate that a time domain resource and a frequency domain resource configured for the receive side device are canceled, the receive side device determines that the resource that needs to be canceled is the resource of the filled slash part in FIG. 2 according to the resource configuration information, and the receive side device no longer uses the resource of this part for information transmission.

Alternatively, for another example, the resource configuration information received by the receive side device includes information used to indicate the number of resource cycles corresponding to the configured resource of the receive side device that is canceled. The information indicates that the number of the resource cycles corresponding to the configured resource of the receive side device that is canceled is 2. Then, the receive side device determines that a resource in two resource cycles after receiving the resource configuration information is the resource that needs to be canceled (for example, the last two resources on the time axis in the figure). Then, the receive side device no longer uses the resource of this part to transmit information.

Alternatively, for another example, the number of symbols occupied by a resource in a resource cycle in time is 6, and the resource configuration information includes information used to indicate the number of symbols occupied by the configured resource of the receive side device that is canceled. The information indicates that the number of symbols occupied by the configured resource of the receive side device that is canceled is 3. Then, the receive side device can determine that the first three symbols of six symbols need to be canceled or the last three symbols need to be canceled according to prior agreement with the transmit side device.

In some embodiments, the resource configuration information is used to indicate the resource canceled for the transmit side device. The resource configuration information includes at least one of following information: information used to indicate a time domain resource and/or a frequency domain resource canceled for the transmit side device; information used to indicate a start time or an end time of a resource canceled for the transmit side device; information used to indicate a quantity of resource periods corresponding to a resource canceled for the transmit side device; information used to indicate a quantity of resources canceled for the transmit side device; information used to indicate a quantity of symbols or a quantity of slots occupied by a resource canceled for the transmit side device; or information used to indicate a BWP or a carrier of a symbol occupied by a resource canceled for the transmit side device. In this case, the transmit side device informs the receive side device of the resource canceled for the transmit side device. The receive side device can determine, according to the resource canceled for the transmit side device, the configured resource that needs to be canceled.

In some embodiments, the resource that needs to be canceled is a configured resource that needs to be shifted (Shifting). The resource configuration information includes at least one of following information: information used to indicate a time domain resource that needs to be shifted and/or a frequency domain resource that needs to be shifted; information used to indicate a start time or an end time of a resource that needs to be shifted; information used to indicate a time domain resource or a frequency domain resource to which a resource that needs to be shifted is shifted; information used to indicate a quantity of resource periods corresponding to a resource that needs to be shifted; information used to indicate a quantity of resources that need to be shifted; information used to indicate a quantity of symbols or a quantity of slots occupied by a resource that needs to be shifted; or information used to indicate a BWP or a carrier of a symbol occupied by a resource that needs to be shifted.

For example, as shown in FIG. 3, the filled solid part in FIG. 3 represents a resource that has been configured for the receive side device, the filled vertical part represents the resource configuration information, and the filled slash part represents a shifted resource. If the resource configuration information received by the receive side device includes information used to indicate a time domain resource and a frequency domain resource that needs to be shifted, the receive side device determines that the resource that needs to be shifted is a resource 3 in FIG. 3 according to the resource configuration information, and the receive side device no longer uses the resource 3 for information transmission. The receive side device can shift the resource 3 to obtain the shifted resource according to agreement with the transmit side device, and use the shifted resource for information transmission.

Alternatively, for another example, the resource configuration information received by the receive side device includes information used to indicate the number of resource cycles corresponding to the resource that needs to be shifted. The information indicates that the number of the resource cycles corresponding to the resource that needs to be shifted is 2. Then, the receive side device determines that a resource in two resource cycles after receiving the resource configuration information is the resource that needs to be shifted (for example, the resource 3 and the resource 4 in the figure). Then, the receive side device no longer uses the resource 3 and the resource 4 to transmit information. Further, according to the agreement with the transmit side device, the receive side device can shift the resource 3 and the resource 4 to obtain shifted resources, and use the shifted resources to transmit information.

In some embodiments, the resource configuration information is used to indicate a resource that is shifted for the transmit side device. The resource configuration information includes at least one of following information: information used to indicate a time domain resource and/or a frequency domain resource that is shifted for the transmit side device; information used to indicate a start time or an end time of a resource that is shifted for the transmit side device; information used to indicate a time domain resource or a frequency domain resource to which a resource is shifted for the transmit side device; information used to indicate a quantity of resource periods corresponding to a resource that is shifted for the transmit side device; information used to indicate that a quantity of resources that are shifted for the transmit side device; information used to indicate a quantity of symbols or a quantity of slots occupied by a resource that is shifted for the transmit side device; or information used to indicate a BWP or a carrier of a symbol occupied by a resource that is shifted for the transmit side device. In this case, the transmit side device informs the receive side device of the resource shifted for the transmit side device. The receive side device can determine, according to the resource shifted for the transmit side device, the configured resource that needs to be canceled, and may determine the shifted resource of the resources that need to be canceled, and use the shifted resources for information transmission.

In some embodiments, the resource that needs to be canceled is already configured for a target hybrid automatic repeat request (HARQ) process. The resource configuration information includes information used to indicate a sequence number of the target HARQ process.

For example, as shown in FIG. 4, the resource that needs to be canceled has been allocated for a HARQ process x, and then the resource configuration information includes information used to indicate x. The receive side device can determine, according to the resource configuration information, that the resource that has been allocated for the HARQ process x needs to be canceled. In accordance with the agreement with the transmit side device or according to the instruction of the transmit side device. The receive side device can determine periods in which the resource that has been allocated for the HARQ process x needs to be canceled. It may be understood that canceling the resource that has been allocated for the HARQ process x can also be understood as canceling the HARQ process x.

On the basis of all the above embodiments, optionally, the method shown in FIG. 1 also includes: sending feedback information to the transmit side device, where the feedback information is used by the transmit side device to determine the resource configuration information successfully received by the receive side device. The feedback information is sent to the transmit side device, so that the transmit side device can clearly know whether the resource configuration information has been sent successfully, which can improve the effectiveness of communication.

In some embodiments, if the resource configuration information is sent by the transmit side device through physical layer signaling or a MAC CE, the receive side device may send the feedback information by returning an acknowledgment with a MAC CE.

The foregoing describes the resource allocation method according to some embodiments of the present disclosure in detail with reference to FIG. 1 to FIG. 4. Following describes another example of the resource allocation method according to the present disclosure in detail with reference to FIG. 5. It may be understood that the interaction between the transmit side device and the receive side device described on the transmit side device side is the same as that described on the receive side device side in the methods shown in FIG. 1 to FIG. 4. To avoid repetition, relevant descriptions are appropriately omitted. The method shown in FIG. 5 is performed by the transmit side device, and as shown in FIG. 5, the method includes:

S210: sending resource configuration information to a receive side device, where the resource configuration information is used by the receive side device to determine a configured resource that needs to be canceled.

It may be understood that when no service arrives at some resources of resources that have been configured for the receive side device, the transmit side device can use the resource configuration information to notify the receive side device to cancel the resources, or when no service arrives at some resources of resources that have been configured for the receive side device, the transmit side device can cancel some resources, and informs the receive side device of the resources by using the resource configuration information, so that the receive side device can determine, according to the resource configuration information, the resources that need to be canceled.

Optionally, in an example, the resource that needs to be canceled is a configured resource of the receive side device that is canceled.

The resource configuration information includes at least one of following information: information used to indicate a configured time domain resource and/or frequency domain resource of the receive side device that is canceled; information used to indicate a start time or an end time of a configured resource of the receive side device that is canceled; information used to indicate a quantity of resource periods corresponding to a configured resource of the receive side device that is canceled; information used to indicate a quantity of configured resources of the receive side device that are canceled; information used to indicate a quantity of symbols or a quantity of slots occupied by a configured resource of the receive side device that is canceled; or information used to indicate a BWP or a carrier of a symbol occupied by a configured resource of the receive side device that is canceled.

Optionally, in an example, the resource configuration information is used to indicate a resource canceled for the transmit side device.

The resource configuration information includes at least one of following information: information used to indicate a time domain resource and/or a frequency domain resource canceled for the transmit side device; information used to indicate a start time or an end time of a resource canceled for the transmit side device; information used to indicate a quantity of resource periods corresponding to a resource canceled for the transmit side device; information used to indicate a quantity of resources canceled for the transmit side device; information used to indicate a quantity of symbols or a quantity of slots occupied by a resource canceled for the transmit side device; or information used to indicate a BWP or a carrier of a symbol occupied by a resource canceled for the transmit side device.

Optionally, in an example, the resource that needs to be canceled is already configured for a target HARQ process.

Optionally, in an example, the resource configuration information includes information used to indicate a sequence number of the target HARQ process.

Optionally, in an example, the resource that needs to be canceled is a resource that needs to be shifted in the configured resource.

The resource configuration information includes at least one of following information: information used to indicate a time domain resource that needs to be shifted and/or a frequency domain resource that needs to be shifted; information used to indicate a start time or an end time of a resource that needs to be shifted; information used to indicate a time domain resource or a frequency domain resource to which a resource that needs to be shifted is shifted; information used to indicate a quantity of resource periods corresponding to a resource that needs to be shifted; information used to indicate a quantity of resources that need to be shifted; information used to indicate a quantity of symbols or a quantity of slots occupied by a resource that needs to be shifted; or information used to indicate a BWP or a carrier of a symbol occupied by a resource that needs to be shifted.

Optionally, in an example, the resource configuration information is used to indicate a resource that is shifted for the transmit side device.

The resource configuration information includes at least one of following information: information used to indicate a time domain resource and/or a frequency domain resource that is shifted for the transmit side device; information used to indicate a start time or an end time of a resource that is shifted for the transmit side device; information used to indicate a time domain resource or a frequency domain resource to which a resource is shifted for the transmit side device; information used to indicate a quantity of resource periods corresponding to a resource that is shifted for the transmit side device; information used to indicate that a quantity of resources that are shifted for the transmit side device; information used to indicate a quantity of symbols or a quantity of slots occupied by a resource that is shifted for the transmit side device; or information used to indicate a BWP or a carrier of a symbol occupied by a resource that is shifted for the transmit side device.

Optionally, in an example, the method shown in FIG. 5 further includes: receiving feedback information from the receive side device, where the feedback information is used by the transmit side device to determine the resource configuration information successfully received by the receive side device.

Optionally, in an example, the receive side device is receiving terminal device UE on a sidelink, and the transmit side device is sending UE on the sidelink; or the receive side device is sending UE on a sidelink, and the transmit side device is a network device or resource allocation UE on the sidelink.

The foregoing describes the resource allocation method according to some embodiments of the present disclosure in detail with reference to FIG. 1 to FIG. 5. A receive side device according to some embodiments of the present disclosure is described in detail below with reference to FIG. 6.

FIG. 6 is a schematic structural diagram of a receive side device according to some embodiments the present disclosure. As shown in FIG. 6, the receive side device 60 includes:

a transceiver module 61, configured to receive resource configuration information from a transmit side device, where the resource configuration information is used by the receive side device to determine a configured resource that needs to be canceled.

The receive side device in some embodiments of the present disclosure receives the resource configuration information, and determines, according to the resource configuration information, a configured resource that needs to be canceled. Thus, the resource that needs to be canceled is no longer used for information transmission, and the resource that needs to be canceled can be used by another device for information transmission, so that when no service arrives at the receive side device, another device can reuse the resource that has been configured for the receive side device, to improve resource utilization.

Optionally, in an example, the resource that needs to be canceled is a configured resource of the receive side device that is canceled.

The resource configuration information includes at least one of following information: information used to indicate a configured time domain resource and/or frequency domain resource of the receive side device that is canceled; information used to indicate a start time or an end time of a configured resource of the receive side device that is canceled; information used to indicate a quantity of resource periods corresponding to a configured resource of the receive side device that is canceled; information used to indicate a quantity of configured resources of the receive side device that are canceled; information used to indicate a quantity of symbols or a quantity of slots occupied by a configured resource of the receive side device that is canceled; or information used to indicate a BWP or a carrier of a symbol occupied by a configured resource of the receive side device that is canceled.

Optionally, in an example, the resource configuration information is used to indicate a resource canceled for the transmit side device.

The resource configuration information includes at least one of following information: information used to indicate a time domain resource and/or a frequency domain resource canceled for the transmit side device; information used to indicate a start time or an end time of a resource canceled for the transmit side device; information used to indicate a quantity of resource periods corresponding to a resource canceled for the transmit side device; information used to indicate a quantity of resources canceled for the transmit side device; information used to indicate a quantity of symbols or a quantity of slots occupied by a resource canceled for the transmit side device; or information used to indicate a BWP or a carrier of a symbol occupied by a resource canceled for the transmit side device.

Optionally, in an example, the resource that needs to be canceled is already configured for a target HARQ process.

Optionally, in an example, the resource configuration information includes information used to indicate a sequence number of the target HARQ process.

Optionally, in an example, the resource that needs to be canceled is a resource that needs to be shifted in the configured resource; and the resource configuration information includes at least one of following information: information used to indicate a time domain resource that needs to be shifted and/or a frequency domain resource that needs to be shifted; information used to indicate a start time or an end time of a resource that needs to be shifted; information used to indicate a time domain resource or a frequency domain resource to which a resource that needs to be shifted is shifted; information used to indicate a quantity of resource periods corresponding to a resource that needs to be shifted; information used to indicate a quantity of resources that need to be shifted; information used to indicate a quantity of symbols or a quantity of slots occupied by a resource that needs to be shifted; or information used to indicate a BWP or a carrier of a symbol occupied by a resource that needs to be shifted.

Optionally, in an example, the resource configuration information is used to indicate a resource that is shifted for the transmit side device.

The resource configuration information includes at least one of following information: information used to indicate a time domain resource and/or a frequency domain resource that is shifted for the transmit side device; information used to indicate a start time or an end time of a resource that is shifted for the transmit side device; information used to indicate a time domain resource or a frequency domain resource to which a resource is shifted for the transmit side device; information used to indicate a quantity of resource periods corresponding to a resource that is shifted for the transmit side device; information used to indicate that a quantity of resources that are shifted for the transmit side device; information used to indicate a quantity of symbols or a quantity of slots occupied by a resource that is shifted for the transmit side device; or information used to indicate a BWP or a carrier of a symbol occupied by a resource that is shifted for the transmit side device. Optionally, in an example, the transceiver module is further configured to: send feedback information to the transmit side device, where the feedback information is used by the transmit side device to determine the resource configuration information successfully received by the receive side device.

Optionally, in an example, the receive side device is receiving terminal device UE on a sidelink, and the transmit side device is sending UE on the sidelink; or the receive side device is sending UE on a sidelink, and the transmit side device is a network device or resource allocation UE on the sidelink.

The receive side device provided in some embodiments of the present disclosure can implement each process implemented by the receive side device in the method embodiments in FIG. 1 to FIG. 4. To avoid repetition, details are not described herein again.

FIG. 7 is a schematic structural diagram of a transmit side device according to some embodiments the present disclosure. As shown in FIG. 7, a transmit side device 70 includes:

a transceiver module 71, configured to send resource configuration information to a receive side device, where the resource configuration information is used by the receive side device to determine a configured resource that needs to be canceled.

The transmit side device in some embodiments of the present disclosure sends the resource configuration information to the receive side device, so that the receive side device determines, according to the resource configuration information, the configured resource that needs to be canceled, and thus no longer uses the resource that needs to be canceled for information transmission, and the resource that needs to be canceled can be used by another device for information transmission, so that when no service arrives at the receive side device, another device can reuse the resource that has been configured for the receive side device, to improve resource utilization.

Optionally, in an example, the resource that needs to be canceled is a configured resource of the receive side device that is canceled.

The resource configuration information includes at least one of following information: information used to indicate a configured time domain resource and/or frequency domain resource of the receive side device that is canceled; information used to indicate a start time or an end time of a configured resource of the receive side device that is canceled; information used to indicate a quantity of resource periods corresponding to a configured resource of the receive side device that is canceled; information used to indicate a quantity of configured resources of the receive side device that are canceled; information used to indicate a quantity of symbols or a quantity of slots occupied by a configured resource of the receive side device that is canceled; or information used to indicate a BWP or a carrier of a symbol occupied by a configured resource of the receive side device that is canceled.

Optionally, in an example, the resource configuration information is used to indicate a resource canceled for the transmit side device.

The resource configuration information includes at least one of following information: information used to indicate a time domain resource and/or a frequency domain resource canceled for the transmit side device; information used to indicate a start time or an end time of a resource canceled for the transmit side device; information used to indicate a quantity of resource periods corresponding to a resource canceled for the transmit side device; information used to indicate a quantity of resources canceled for the transmit side device; information used to indicate a quantity of symbols or a quantity of slots occupied by a resource canceled for the transmit side device; or information used to indicate a BWP or a carrier of a symbol occupied by a resource canceled for the transmit side device.

Optionally, in an example, the resource that needs to be canceled is already configured for a target HARQ process.

Optionally, in an example, the resource configuration information includes information used to indicate a sequence number of the target HARQ process.

Optionally, in an example, the resource that needs to be canceled is a resource that needs to be shifted in the configured resource; and the resource configuration information includes at least one of following information: information used to indicate a time domain resource that needs to be shifted and/or a frequency domain resource that needs to be shifted; information used to indicate a start time or an end time of a resource that needs to be shifted; information used to indicate a time domain resource or a frequency domain resource to which a resource that needs to be shifted is shifted; information used to indicate a quantity of resource periods corresponding to a resource that needs to be shifted; information used to indicate a quantity of resources that need to be shifted; information used to indicate a quantity of symbols or a quantity of slots occupied by a resource that needs to be shifted; or information used to indicate a BWP or a carrier of a symbol occupied by a resource that needs to be shifted.

Optionally, in an example, the resource configuration information is used to indicate a resource that is shifted for the transmit side device; and the resource configuration information includes at least one of following information: information used to indicate a time domain resource and/or a frequency domain resource that is shifted for the transmit side device; information used to indicate a start time or an end time of a resource that is shifted for the transmit side device; information used to indicate a time domain resource or a frequency domain resource to which a resource is shifted for the transmit side device; information used to indicate a quantity of resource periods corresponding to a resource that is shifted for the transmit side device; information used to indicate that a quantity of resources that are shifted for the transmit side device; information used to indicate a quantity of symbols or a quantity of slots occupied by a resource that is shifted for the transmit side device; or information used to indicate a BWP or a carrier of a symbol occupied by a resource that is shifted for the transmit side device.

Optionally, as an example, the transceiver module 71 is further configured to: receive feedback information from the receive side device, where the feedback information is used by the transmit side device to determine the resource configuration information successfully received by the receive side device.

Optionally, in an example, the receive side device is receiving terminal device UE on a sidelink, and the transmit side device is sending UE on the sidelink; or the receive side device is sending UE on a sidelink, and the transmit side device is a network device or resource allocation UE on the sidelink.

The transmit side device provided in some embodiments of the present disclosure can implement the processes that are implemented by the transmit side device in the method embodiments of FIG. 5. To avoid repetition, details are not described herein again.

FIG. 8 is a schematic structural diagram of a receive side device according to some embodiments of the present disclosure. As shown in FIG. 8, a receive side device 800 includes at least one processor 810, a memory 820, at least one network interface 830, and a user interface 840. Components in the receive side device 800 are coupled together by using a bus system 850. It can be understood that the bus system 850 is configured to implement connection and communication between these components. In addition to a data bus, the bus system 850 further includes a power bus, a control bus, and a status signal bus. However, for clear description, various buses are marked as the bus system 850 in FIG. 8.

The user interface 840 may include a display, a keyboard, or a clicking device (for example, a mouse, a trackball (trackball), a touch panel, or a touchscreen).

It may be understood that the memory 820 in this embodiment of the present disclosure may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), and is used as an external cache. As exemplary but not limitative descriptions, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synclink DRAM, SLDRAM), and a direct rambus random access memory (Direct Rambus RAM, DRRAM). The memory 320 in the system and method described in the embodiments of the present disclosure is intended to include but is not limited to these and any other suitable type of memory.

In some embodiments, the memory 820 stores following element: an executable module or a data structure, a subset thereof, or an extended set thereof: an operating system 821 and an application program 822.

The operating system 821 includes various system programs, for example, a framework layer, a kernel library layer, and a driver layer, and is configured to implement various basic services and process hardware-based tasks. The application program 822 includes various application programs, for example, a media player (Media Player) and a browser (Browser), and is configured to implement various application services. A program for implementing the method in the embodiments of the present disclosure may be included in the application program 822.

In some embodiments of the present disclosure, the receive side device 800 further includes: a computer program stored in the memory 820 and capable of running on the processor 810, where when the computer program is executed by the processor 810, the processes of the foregoing methods in FIG. 1 to FIG. 4 are implemented, and the same technical effects can be achieved. To avoid repetition, details are not described herein again.

The method disclosed in some embodiments of the present disclosure may be applied to the processor 810 or implemented by the processor 810. The processor 810 may be an integrated circuit chip having a signal processing capability. During implementation, the steps of the foregoing method can be completed by hardware integrated logic circuits in the processor 810 or instructions in the form of software. The foregoing processor 810 may be a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or transistor logic device, or a discrete hardware component. The processor 810 may implement or execute the methods, steps, and logic block diagrams disclosed in the embodiments of the present disclosure. The general-purpose processor may be a microprocessor or may be any conventional processor or the like. The steps of the method disclosed in some embodiments of the present disclosure may be directly performed by a hardware decoding processor or by a combination of hardware and software modules in the decoding processor. The software module may be located in a mature non-transitory computer-readable storage medium in this field such as a random access memory, a flash memory, a read-only memory, a programmable read-only memory or an electrically erasable programmable memory, or a register. The non-transitory computer-readable storage medium is located in the memory 820, and the processor 810 reads information from the memory 820 and completes the steps of the foregoing method in combination with its hardware. The non-transitory computer-readable storage medium stores a computer program, and when the computer program is executed by the processor 810, the steps of the method embodiments shown in FIG. 1 to FIG. 4 are performed.

It can be understood that those embodiments described in the embodiments of the present disclosure can be implemented by hardware, software, firmware, middleware, microcode, or a combination thereof. For implementation with hardware, the processing unit may be implemented in one or more application specific integrated circuits (Application Specific Integrated Circuit, ASIC), a digital signal processor (Digital Signal Processor, DSP), a digital signal processing device (DSP Device, DSPD), a programmable logic device (Programmable Logic Device, PLD), a field-programmable gate array (Field-Programmable Gate Array, FPGA), a general-purpose processor, a controller, a micro-controller, a microprocessor, another electronic unit for implementing the functions of the present disclosure, or a combination thereof.

For implementation by software, technologies described in some embodiments of the present disclosure may be implemented by executing functional modules (for example, a process and a function) in the embodiments of the present disclosure. Software code can be stored in the memory and executed by the processor. The memory can be implemented inside or outside the processor.

Figure 9:
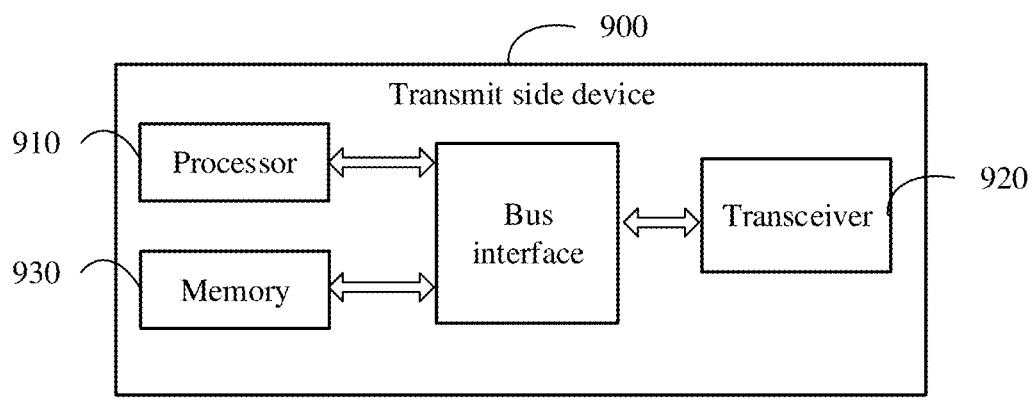
FIG. 9 is a schematic structural diagram 2 of a transmit side device according to the present disclosure.

FIG. 9 is a schematic structural diagram of a transmit side device according to another embodiment of the present disclosure. As shown in FIG. 9, a transmit side device 900 includes: a processor 910, a transceiver 920, a memory 930, and a bus interface.

In some embodiments of the present disclosure, the transmit side device 900 further includes: a computer program stored in the memory 930 and capable of running on the processor 910, where when the computer program is executed by the processor 910, the processes of the foregoing method in FIG. 5 are implemented, and the same technical effects can be achieved. To avoid repetition, details are not described herein again.

In FIG. 9, a bus architecture can include any quantity of interconnected buses and bridges, which are specifically connected together by circuits of one or more processors represented by the processor 910 and a memory represented by the memory 930. The bus architecture may further link various other circuits such as a peripheral device, a voltage regulator, and a power management circuit together. These are all well-known in the art, and therefore are not further described in this specification. The bus interface provides an interface. The transceiver 920 can include a plurality of elements, namely a transmitter and a receiver, and provides units for communication with various other apparatuses on a transmission medium.

The processor 910 is responsible for management of a bus architecture and general processing. The memory 930 may store data used when the processor 910 performs an operation.

Some embodiments of the present disclosure further provide a non-transitory computer-readable storage medium. The non-transitory computer-readable storage medium stores a computer program, and when the computer program is executed by a processor, the processes in the method embodiment shown in FIG. 1 to FIG. 5 are implemented, and a same technical effect can be achieved. To avoid repetition, details are not described herein. The non-transitory computer-readable storage medium is, for example, a read-only memory (Read-Only Memory, ROM for short), a random access memory (Random Access Memory, RAM for short), a magnetic disk, or an optical disc.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

Those of ordinary skill in the art can realize that the exemplary units and algorithm steps described with reference to the embodiments disclosed in this specification can be implemented by electronic hardware or a combination of computer software and electronic hardware. Whether these functions are implemented by hardware or software depends on specific applications and design constraints of the technical solutions. Those skilled in the art may use different methods to implement the described functions for each specific application, but such implementation should not be considered as beyond the scope of the present disclosure.

Those skilled in the art can clearly understand that to describe conveniently and concisely, for a specific working process of the system, apparatus, and unit described above, refer to the corresponding process in the foregoing method embodiments. Details are not described herein again.

In the embodiments provided in the present disclosure, it should be understood that the disclosed apparatuses and methods may be implemented in other ways. For example, the apparatus embodiments described above are only an example. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected according to actual needs to achieve the objective of the solutions of the embodiments.

In addition, functional units in each embodiment of this disclosure may be integrated into one processing unit, or each unit may have separate physical existence, or two or more units may be integrated in one unit.

If the function is implemented in the form of software function units and sold or used as independent products, the function may be stored in a computer-readable storage medium. Based on this understanding, the essence of the technical solutions of this disclosure, or the part contributing to the prior art, or some of the technical solutions may be presented in the form of software products. The computer software products are stored in a storage medium, and include a number of instructions to enable a computer device (which may be a personal computer, a server, a network device, or the like) to perform all or some of the steps of the methods described in various embodiments of this disclosure. The storage medium includes various mediums, such as a USB flash disk, a removable hard disk, a ROM, a RAM, a magnetic disk, or an optical disc, that can store program code.

It can be understood that those embodiments described in the embodiments of the present disclosure can be implemented by hardware, software, firmware, middleware, microcode, or a combination thereof. For implementation with hardware, the processing unit may be implemented in one or more application specific integrated circuits (Application Specific Integrated Circuit, ASIC), a digital signal processor (Digital Signal Processing, DSP), a digital signal processing device (DSP Device, DSPD), a programmable logic device (Programmable Logic Device, PLD), a field-programmable gate array (Field-Programmable Gate Array, FPGA), a general-purpose processor, a controller, a micro-controller, a microprocessor, another electronic unit for implementing the functions of the present disclosure, or a combination thereof.

For implementation by software, technologies described in the embodiments of the present disclosure may be implemented by executing functional modules (for example, a process and a function) in the embodiments of the present disclosure. Software code can be stored in the memory and executed by the processor. The memory can be implemented inside or outside the processor.

Those of ordinary skill in the art can understand that some or all processes of the realization of the foregoing method in the embodiments can be implemented by controlling relevant hardware by the computer program. The foregoing program may be stored on a computer-readable storage medium, where when the program is executed, the processes of the embodiments of the foregoing methods can be included. The storage medium can be a magnetic disk, an optical disc, a ROM, a RAM or the like.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A resource allocation method, applied to a receive side device, the resource allocation method comprising:

receiving resource configuration information from a transmit side device, wherein the resource configuration information is used by the receive side device to determine a resource that needs to be canceled from a configured resource; wherein the configured resource is a resource configured for the receive side device in a scheduled resource allocation mode, or a resource configured for the receive side device in an autonomous resource selection mode; and in the scheduled resource allocation mode, a network device performs control and allocates a resource for the receive side device, and in the autonomous resource selection mode, a resource is autonomously selected by the receive side device from a resource pool; wherein the resource that needs to be canceled is already configured for a target hybrid automatic repeat request (HARQ) process; and the resource configuration information comprises information used to indicate a sequence number of the target HARQ process.

2. The method according to claim 1, wherein the resource that needs to be canceled is a configured resource of the receive side device that is canceled; and the resource configuration information comprises at least one of following information:

information used to indicate a configured time domain resource or frequency domain resource of the receive side device that is canceled;

information used to indicate a start time or an end time of a configured resource of the receive side device that is canceled;

information used to indicate a quantity of resource periods corresponding to a configured resource of the receive side device that is canceled;

information used to indicate a quantity of configured resources of the receive side device that are canceled;

information used to indicate a quantity of symbols or a quantity of slots occupied by a configured resource of the receive side device that is canceled; or information used to indicate a bandwidth part (BWP) or a carrier of a symbol occupied by a configured resource of the receive side device that is canceled.

3. The method according to claim 1, wherein the resource configuration information is used to indicate a resource canceled for the transmit side device; and the resource configuration information comprises at least one of following information:

information used to indicate a time domain resource or a frequency domain resource canceled for the transmit side device;

information used to indicate a start time or an end time of a resource canceled for the transmit side device;

information used to indicate a quantity of resource periods corresponding to a resource canceled for the transmit side device;

information used to indicate a quantity of resources canceled for the transmit side device;

information used to indicate a quantity of symbols or a quantity of slots occupied by a resource canceled for the transmit side device; or information used to indicate a bandwidth part (BWP) or a carrier of a symbol occupied by a resource canceled for the transmit side device.

4. The method according to claim 1, wherein the resource that needs to be canceled is a resource that needs to be shifted in the configured resource; and the resource configuration information comprises at least one of following information:

information used to indicate a time domain resource that needs to be shifted or a frequency domain resource that needs to be shifted;

information used to indicate a start time or an end time of a resource that needs to be shifted;

information used to indicate a time domain resource or a frequency domain resource to which a resource that needs to be shifted is shifted;

information used to indicate a quantity of resource periods corresponding to a resource that needs to be shifted;

information used to indicate a quantity of resources that need to be shifted;

information used to indicate a quantity of symbols or a quantity of slots occupied by a resource that needs to be shifted; or information used to indicate a bandwidth part (BWP) or a carrier of a symbol occupied by a resource that needs to be shifted.

5. The method according to claim 1, wherein the resource configuration information is used to indicate a resource that is shifted for the transmit side device; and the resource configuration information comprises at least one of following information:

information used to indicate a time domain resource or a frequency domain resource that is shifted for the transmit side device;

information used to indicate a start time or an end time of a resource that is shifted for the transmit side device;

information used to indicate a time domain resource or a frequency domain resource to which a resource is shifted for the transmit side device;

information used to indicate a quantity of resource periods corresponding to a resource that is shifted for the transmit side device;

information used to indicate a quantity of resources that are shifted for the transmit side device;

information used to indicate a quantity of symbols or a quantity of slots occupied by a resource that is shifted for the transmit side device; or information used to indicate a bandwidth part (BWP) or a carrier of a symbol occupied by a resource that is shifted for the transmit side device.

6. The method according to claim 1, further comprising:

sending feedback information to the transmit side device, wherein the feedback information is used by the transmit side device to determine the resource configuration information successfully received by the receive side device.

7. The method according to claim 1, wherein the receive side device is a receiving user equipment (UE) on a sidelink, and the transmit side device is a sending UE on the sidelink; or the receive side device is a sending UE on a sidelink, and the transmit side device is a network device or a resource allocation UE on the sidelink.

8. A resource allocation method, applied to a transmit side device, the resource allocation method comprising:

sending resource configuration information to a receive side device, wherein the resource configuration information is used by the receive side device to determine a resource that needs to be canceled from a configured resource; wherein the configured resource is a resource configured for the receive side device in a scheduled resource allocation mode, or a resource configured for the receive side device in an autonomous resource selection mode; and in the scheduled resource allocation mode, a network device performs control and allocates a resource for the receive side device, and in the autonomous resource selection mode, a resource is autonomously selected by the receive side device from a resource pool; wherein the resource that needs to be canceled is already configured for a target hybrid automatic repeat request (HARQ) process; and the resource configuration information comprises information used to indicate a sequence number of the target HARQ process.

9. The method according to claim 8, wherein the resource that needs to be canceled is a configured resource of the receive side device that is canceled; and the resource configuration information comprises at least one of following information:

information used to indicate a configured time domain resource or frequency domain resource of the receive side device that is canceled;

information used to indicate a start time or an end time of a configured resource of the receive side device that is canceled;

information used to indicate a quantity of resource periods corresponding to a configured resource of the receive side device that is canceled;

information used to indicate a quantity of configured resources of the receive side device that are canceled;

information used to indicate a quantity of symbols or a quantity of slots occupied by a configured resource of the receive side device that is canceled; or information used to indicate a bandwidth part (BWP) or a carrier of a symbol occupied by a configured resource of the receive side device that is canceled.

10. The method according to claim 8, wherein the resource configuration information is used to indicate a resource canceled for the transmit side device; and the resource configuration information comprises at least one of following information:

information used to indicate a time domain resource or a frequency domain resource canceled for the transmit side device;

information used to indicate a start time or an end time of a resource canceled for the transmit side device;

information used to indicate a quantity of resource periods corresponding to a resource canceled for the transmit side device;

information used to indicate a quantity of resources canceled for the transmit side device;

information used to indicate a quantity of symbols or a quantity of slots occupied by a resource canceled for the transmit side device; or information used to indicate a bandwidth part (BWP) or a carrier of a symbol occupied by a resource canceled for the transmit side device.

11. The method according to claim 8, wherein the resource that needs to be canceled is a resource that needs to be shifted in the configured resource; and the resource configuration information comprises at least one of following information:

information used to indicate a time domain resource that needs to be shifted or a frequency domain resource that needs to be shifted;

information used to indicate a start time or an end time of a resource that needs to be shifted;

information used to indicate a time domain resource or a frequency domain resource to which a resource that needs to be shifted is shifted;

information used to indicate a quantity of resource periods corresponding to a resource that needs to be shifted;

information used to indicate a quantity of resources that need to be shifted;

information used to indicate a quantity of symbols or a quantity of slots occupied by a resource that needs to be shifted; or information used to indicate a bandwidth part (BWP) or a carrier of a symbol occupied by a resource that needs to be shifted.

12. The method according to claim 8, wherein the resource configuration information is used to indicate a resource that is shifted for the transmit side device; and the resource configuration information comprises at least one of following information:

information used to indicate a time domain resource or a frequency domain resource that is shifted for the transmit side device;

information used to indicate a start time or an end time of a resource that is shifted for the transmit side device;

information used to indicate a time domain resource or a frequency domain resource to which a resource is shifted for the transmit side device;

information used to indicate a quantity of resource periods corresponding to a resource that is shifted for the transmit side device;

information used to indicate a quantity of resources that are shifted for the transmit side device;

information used to indicate a quantity of symbols or a quantity of slots occupied by a resource that is shifted for the transmit side device; or information used to indicate a bandwidth part (BWP) or a carrier of a symbol occupied by a resource that is shifted for the transmit side device.

13. A receive-side device, comprising: a memory, a processor, and a computer program stored in the memory and capable of running on the processor, wherein the computer program, when executed by the processor, causes the receive-side device to implement:

receiving resource configuration information from a transmit side device, the resource configuration information is used by the receive side device to determine a resource that needs to be canceled from a configured resource; wherein the configured resource is a resource configured for the receive side device in a scheduled resource allocation mode, or a resource configured for the receive side device in an autonomous resource selection mode; and in the scheduled resource allocation mode, a network device performs control and allocates a resource for the receive side device, and in the autonomous resource selection mode, a resource is autonomously selected by the receive side device from a resource pool; wherein the resource that needs to be canceled is already configured for a target hybrid automatic repeat request (HARQ) process; and the resource configuration information comprises information used to indicate a sequence number of the target HARQ process.

14. A transmit side device, comprising: a memory, a processor, and a computer program that is stored in the memory and that can run on the processor, wherein when the computer program is executed by the processor, steps of the resource allocation method according to claim 8 are implemented.

15. A non-transitory computer-readable medium, wherein the non-transitory computer-readable medium stores a computer program, and when the computer program is executed by a processor, steps of the resource allocation method according to claim 1 are implemented.

16. A non-transitory computer-readable medium, wherein the non-transitory computer-readable medium stores a computer program, and when the computer program is executed by a processor, steps of the resource allocation method according to claim 8 are implemented.

\* \* \* \* \*